US006615044B2

(12) United States Patent
Tigerstedt et al.

(10) Patent No.: US 6,615,044 B2
(45) Date of Patent: Sep. 2, 2003

(54) METHOD OF WCDMA COVERAGE BASED HANDOVER TRIGGERING

(75) Inventors: Karl Tigerstedt, Espoo (FI); Harri Holma, Helsinki (FI); Kai Heikkinen, Helsinki (FI); Atte Artamo, Espoo (FI); Uwe Schwarz, Veikkola (FI); Achim Wacker, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/875,786

(22) Filed: Jun. 6, 2001

(65) Prior Publication Data

US 2002/0187784 A1 Dec. 12, 2002

(51) Int. Cl.[7] .................................................. H04Q 7/38
(52) U.S. Cl. .................... 455/437; 455/442; 370/331
(58) Field of Search .............................. 455/437, 436, 455/442; 370/331, 332

(56) References Cited

U.S. PATENT DOCUMENTS

| | | | |
|---|---|---|---|
| 6,181,943 B1 * | 1/2001 | Kuo et al. .................. | 455/437 |
| 6,212,368 B1 * | 4/2001 | Ramesh et al. ............. | 455/132 |
| 2001/0016482 A1 * | 8/2001 | Bergstrom et al. ......... | 455/332 |
| 2002/0046873 A1 * | 4/2002 | Chung .................... | 174/137 R |

OTHER PUBLICATIONS

3GPP TS 25.101 V3.2.0 3$^{rd}$ Generation Partnership Project; Technical Specification Group Radio Access Networks; UE Radio Transmission and Reception (FDD) (Release 1999).

* cited by examiner

*Primary Examiner*—Thanh Cong Le
*Assistant Examiner*—Nick Corsaro
(74) *Attorney, Agent, or Firm*—Ware, Fressola, Van Der Sluys & Adolphson

(57) ABSTRACT

A method of triggering an IF or IS handover between two WCDMA carrier or a WCDMA carrier and a GSM carrier. Six triggering conditions are used to initiate the search for an alternative network connection by starting the handover measurements. These triggering conditions are: a) the mobile terminal TxPwr has exceeded its threshold value longer than a specified time; b) the connection based power in the downlink has exceeded its threshold value longer than a specified time; c) the mobile terminal TxPwr has reached the maximum value a specified number of times; d) the SIR target at the base station has risen above a specified threshold value over a period of time; e) the mobile terminal TxPwr has exceeded its threshold value and the gradient of the power control signature indicates sudden rise to maximum power level; and f) the pilot power measured at the mobile terminal has fallen below a threshold value for long than a specified time.

28 Claims, 9 Drawing Sheets

METHOD OF WCDMA COVERAGE BASED HANDOVER TRIGGERING

FIELD OF THE INVENTION

The present invention generally relates to a mobile telecommunications network and, in particular, to a handover event when a mobile terminal approaches a border of service area of the mobile phone network.

BACKGROUND OF THE INVENTION

In a mobile phone network, the covering area of an operator is divided into cells. A cell corresponds to the covering area of one transmitter or a small collection of transmitters. When the user of a mobile terminal moves between cells, or the radio coverage areas associated with different base station sites, an ongoing call must be switched to a different radio coverage channel or cell. This is known as handover, or handoff.

The starting point of the third-generation mobile system, Universal Mobile Telecommunication System (UMTS) is the new radio interface generally known as Universal Terrestrial Radio Access Network (UTRAN), and the GSM/GPRS base core network.

UTRAN is a conceptual term identifying a part of a radio communication network, wherein a plurality of mobile terminals communicate with each other through one or more base stations. In particular, UTRAN identifies part of the network, which consists of radio network controllers (RNCs) and Node Bs between an interconnection point (Iu) and the radio interface (Uu). The interconnection point (In) is located between an RNC and a core network, and the radio interface (Uu) is located between UTRAN and the user equipment (UE). One of the modes of UTRAN for the user equipment (UE) is the FDD (Frequency-Division Duplex) mode, as distinguished from the time-division duplex (TDD) mode. UE radio transmission and reception (FDD) is described in the Technical Specification (TS) 25.101 v 3.1.0 (1999–12) of the Third Generation Partnership Project (3GPP) and documents referenced therein. UTRAN can operate in two different modes: Wideband Code Division Multiple Access (WCDM) mode and Time Division/Code Division Multiple Access (TD/CDMA) mode.

WCDMA has a bandwidth of 5 MHz or more. However, the nominal bandwidth for all third-generation proposals is 5 MHz. In 3G WCDMA mobile radio networks, the primary means for keeping a connection for a mobile station from being dropped while moving between different cells of the network uses a procedure known as handover. Handover can be soft handover (SHO) or hard handover. However, SHO is only operational within one operator network on a single 5 MHz UMTS band. In hard handover, the radio frequency band of the connection between the UE and UTRAN is changed or the cell on the same frequency is changed when no network support of macrodiversity exists. Hard handover is possible when the mobile terminal is in the Cell_DCH state (DCH=dedicated channel) and when SHO is not possible within one frequency band of the 3G network. Hard handover is slower and has a higher risk of failure than SHO. When approaching the edge of the network coverage, the mobile terminal must initiate inter-frequency (IF) or inter-system (IS) measurements in an effort to perform a regular HO.

As mentioned above, handover is functionality to keep a connection from being dropped while the mobile terminal is moving from one cell to another cell of the network. However, handover can occur due to a change of radio resources providing a service without necessarily any change of base stations involved. In particular, when the radio resources providing a service change from one of the UTRA modes (UTRA-FDD and UTRA-TDD) to another. Handover can also be due to a change of radio systems, from UMTS to GSM, for example.

In a GSM system, the mobile terminal is the active participant in the handover procedure. The mobile terminal continuously measures the strength of the signal from the serving cell and that of the neighboring cells. The signal strength of the cells can be obtained from the received signal strength indicator (RSSI) measurements of all cells in neighbor list, which is provided by the base station. The signal strength measurements allow the base station controller (BSC) to decide which is the best available cell in order to maintain the quality of the communication link. Two basic algorithms are used for the handover.

With the "minimum acceptable performance" algorithm, the power level of the mobile terminal is increased as the quality of the transmission decreases. A handover is performed when the power increase no longer has effect on the quality of the signal.

With the "power budget" algorithm, the handover is performed when the quality of the signal has deteriorated to a certain degree, without continuously increasing the power level.

When handover is performed from a UTRAN system to a non-UTRAN system, such as GSM, the procedure starts when the UE is receiving the GSM neighbor cell parameters on System Information messages provided on a downlink broadcast control channel (BCCH), or Measurement Control message provided on a downlink dedicated control channel (DCCH). Based on the measurement report from the UE, RNC makes a handover decision. Similarly, when handover is performed from a non-UTRAN system to UTRAN, the procedure starts when the dual-mode UE is receiving the UTRAN neighbor cell parameters on GSM System Information messages. After receiving the measurement report, the GSM BSC makes a handover decision. In GSM, the UE can make inter-system measurements all the time in the same way as normal intra-GSM measurements.

For WCDMA soft handovers, the mobile terminal continuously makes measurements on other cells. For IF and IS handovers, the RNC needs to initiate the measurements by the mobile terminal. Thus, the mobile terminal will not make measurements unless it is particularly commanded. It is desirable and advantageous to provide a method for triggering an IF or IS handover to ensure continuous operation of a mobile terminal as it approaches the border of its current radio network coverage, thereby reducing dropped call rate and improving the quality of a mobile telecommunications network.

SUMMARY OF THE INVENTION

It is a primary object of the invention to ensure continuous operation of a mobile terminal as it approaches the border of its current radio network coverage by way of handover. A successful handover sequence will result in the mobile terminal terminating connection to the original base station and continuing the call at another frequency using the same network system or a different network system. This objective can be achieved by determining in a reliable fashion a point at which the mobile terminal should initiate the search for an alternative network connection by starting the handover measurements.

Accordingly, the present invention provides a method of triggering a handover event in telecommunication networks having a plurality of base stations operated by a plurality of network operators each having one or more frequency carriers, wherein the handover event is used in a frequency division multiplex (FDD) mode of a mobile terminal capable of communicating with one or more base stations of the telecommunication networks over corresponding uplink and downlink, for allowing the mobile terminal to move from the radio coverage area of a first frequency carrier to the radio coverage area of a second frequency carrier while maintaining communication with one or more base stations, wherein the handover event is performed based on signal strength and/or signal quality measurement, said method comprising the steps of:

obtaining a first signal indicative of a triggering parameter;
  determining from the first signal whether the triggering parameter has fulfilled a triggering condition regarding a reference value; and
  providing a second signal when the triggering parameter has fulfilled the triggering condition for starting the signal strength and/or signal quality measurement.

The triggering parameter can be indicative of a transmission power of the mobile terminal in the uplink, and the reference value is indicative of a threshold value for the transmission power, and wherein the triggering condition is fulfilled when the transmission power has exceeded the threshold value over a predetermined period of time.

Alternatively, the triggering parameter is indicative of a transmission power in the downlink to the mobile terminal, and the reference value is indicative of a threshold value of the transmission power, and wherein the triggering condition is fulfilled when the transmission power has exceeded the threshold value over a predetermined period of time.

Alternatively, the triggering parameter is indicative of a transmission power of the mobile terminal and the reference value is a maximum value of the transmission power, and wherein the triggering condition is fulfilled when the transmission power has reached the maximum value over a predetermined number of times during a predetermined period of time.

Alternatively, the triggering parameter is indicative of an uplink signal-to-interference ratio (SIR) targeted at one of the base stations, and the reference value is indicative of a threshold value of the SIR, and wherein the triggering condition is fulfilled when the targeted SIR has exceeded the threshold value over a predetermined period of time.

Alternatively, the triggering parameter is indicative of a transmission power of the mobile terminal, and the reference value is indicative of a threshold value of the transmission power, and wherein the triggering condition is fulfilled when the transmission power has exceeded the threshold value and an average of the transmission power over a period of time indicates that the transmission power is capable of reaching a maximum transmission power within a predetermined period of time.

Alternatively, the triggering parameter is indicative of a ratio of a received signal power to a received signal strength indicator, and the reference value is indicative of a threshold value for the receiver signal power, and wherein the triggering condition is fulfilled when the ratio has fallen below the threshold value over a predetermined period of time.

Preferably, the mobile terminal comprises at least two receivers.

Alternatively, the mobile terminal has only one receiver and the signal strength and/or signal quality measurement is carried out in a compressed data transmission mode.

Preferably, when the mobile terminal has only one receiver, the first network operator has at least one radio network controller for connecting one or more base stations to the telecommunication networks, and wherein the second signal is conveyed from the mobile terminal to the radio network controller for the radio network controller to activate the compressed data transmission mode in the mobile terminal.

Preferably, the aforementioned threshold values can be type specific for macro-cellular networks, micro-cellular networks and pico-cellular networks. Macro cells are outdoor cells with a large cell radius, typically a few tens of kilometers. The cell radius can be extended by the use of directional antennas or repeaters. Micro cells are smaller outdoor cells with a radius of up to 1 kilometer. Pico cells are mainly indoor cells with a radius typically less than 50 meters.

The present invention will become apparent upon reading the description taken in conjunction with FIGS. 1 to 9.

DETAILED DESCRIPTION OF THE INVENTION

It is known that that handovers can be categorized as service-reason, load-reason handovers and coverage-reason handovers. In service-reason handovers, the handover is performed to direct certain services from a frequency carrier to another frequency carrier of the same or different network. In load-reason handovers, the handover from a first frequency carrier to another frequency carrier of the same operator when the load in the first frequency is much higher than the second frequency. Load-reason handovers are also desirable between two different systems when the load on one system is much higher than the load on the other system. Load-reason handovers are not part of the present invention. The present invention is mainly concerned with coverage-reason or coverage-based handovers.

Figure 1:
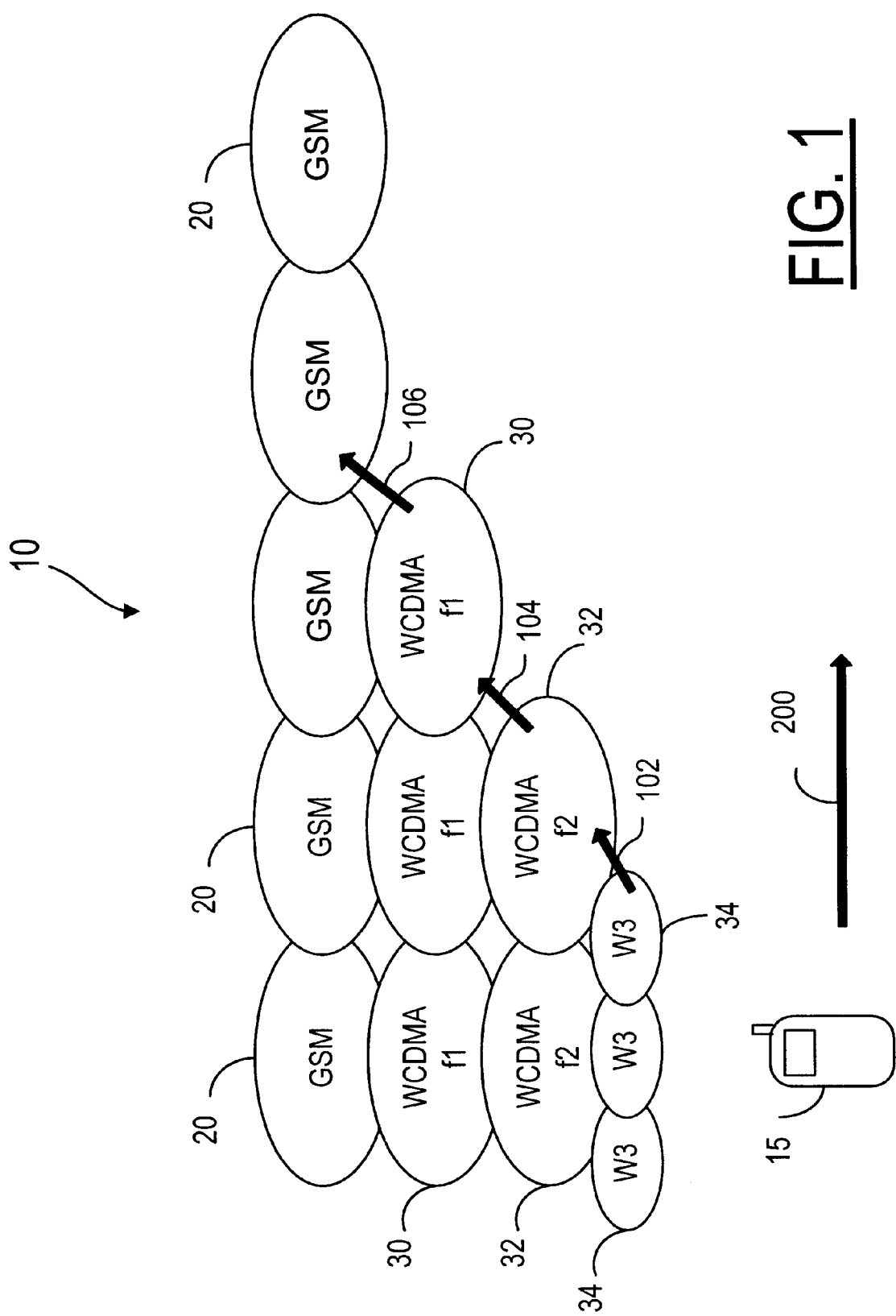
FIG. 1 is a diagrammatic representation illustrating the various situations where a handover is necessary.

When a mobile terminal approaches the border of a service area, either an inter-frequency handover or an inter-system frequency must be triggered. The triggering condition depends on the movement pattern of the mobile terminal, the interference from another radio system, and the pathloss attenuation, among other factors. FIG. 1 illustrates the various situations under which a coverage-reason handover is necessary in telecommunication networks. As shown in FIG. 1, reference numerals 30 and 32 denote 2-frequency macro cells and reference numeral 34 denotes micro cells, all operated in WCDMA mode under one network operator. The operating frequencies of these cells are denoted by f1, f2 and f3. In addition, reference numeral 20 denotes a group of GSM cells under the same operator or a different operator. An inter-frequency handover, as represented by arrow 102, takes place when the mobile terminal 15 moves along a direction 200, crossing from a micro cell 34 into a macro cell 32. Another inter-frequency handover, as represented by arrow 104, takes place when the mobile terminal 15 moves from a macro cell 32 to a macro cell 30. When the mobile terminal moves out of the WCDMA radio coverage area to the GSM radio coverage area, an inter-system handover 106 takes place between a WCDMA cell 30 to a GSM cell 20. In FIG. 1, it is possible that the WCDMA cells 30 and the WCDMA cells 32 are operated under different operators.

Figure 2:
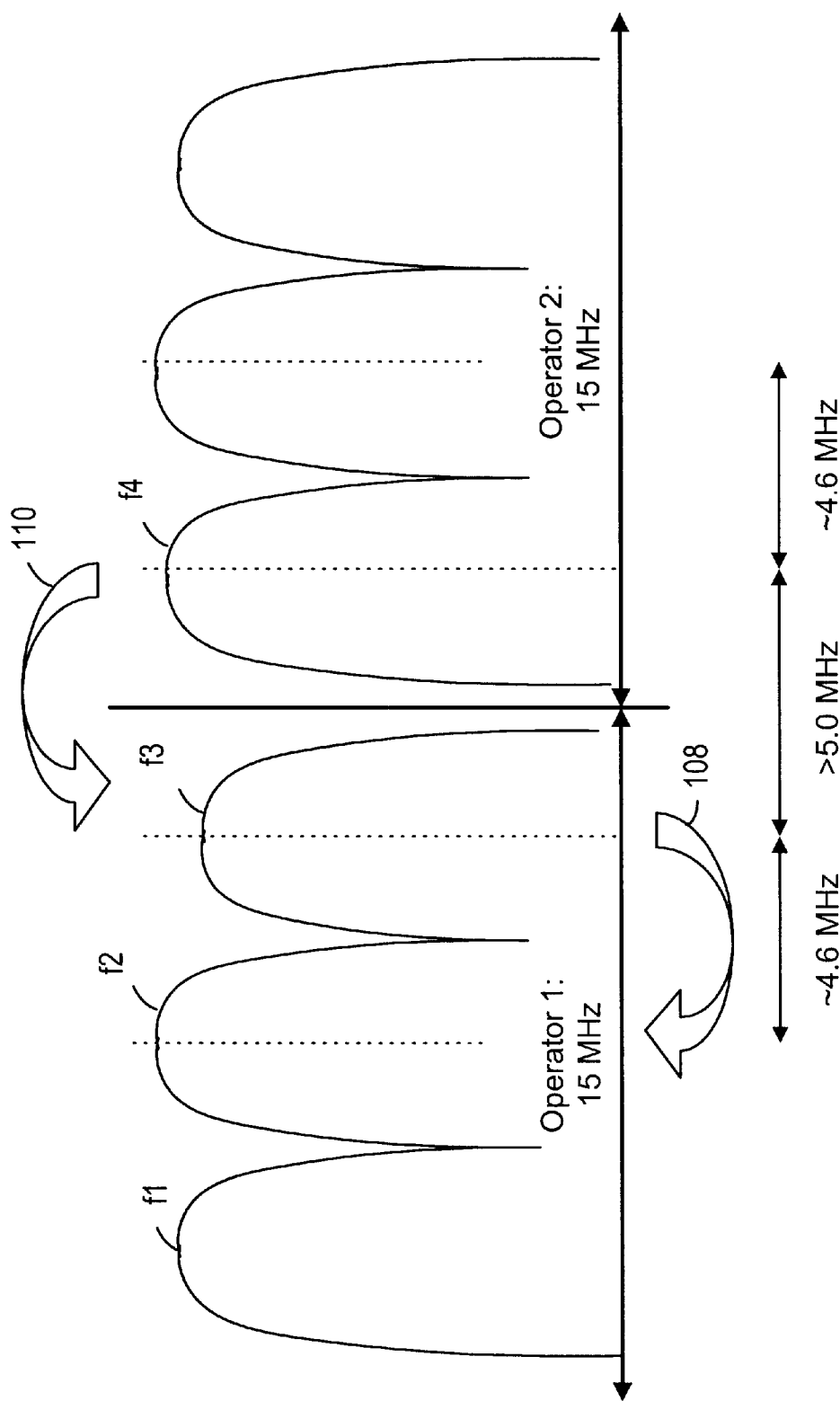
FIG. 2 is a diagrammatic representation illustrating another situation where a handover is desirable.

FIG. 2 illustrates an inter-frequency handover necessitated by interference from a nearby radio system when the mobile terminal is located near the edge of its current cell. The interference is represented by arrow 110. As shown, when the interference from a channel f4 of an Operator 2 affects the operation of the mobile terminal operated in a channel f3 of Operator 1, the adjacent channel interference can be escaped by inter-frequency handover 108 to another channel f2. The adjacent channel interference can also be escaped by inter-system handover to channel f4 of Operator 2.

It is advantageous and desirable to provide a set of triggering options to ensure continuous operation of a mobile terminal as it approaches the limits of its current radio network coverage. The six triggering options, according to the present invention, are illustrated in FIGS. 3 to 8.

When a mobile terminal approaches the edge of its current coverage area, it usually suffers a high pathloss due to its distance to the base station. This pathloss must be compensated for so that it will not be easily over-shouted by another mobile terminal located nearer to the base station. It is the basis for tight and fast power control in WCDMA. As it is known, the solution to power control in WCDMA is fast closed-loop power control. In closed-loop power control in the uplink, the base station performs frequent estimates of the received Signal-to-Interference Ratio (SIR) and compares its to a target SIR. If the measured SIR is higher than the target SIR, the base station will command the mobile station to lower the power. If the measured SIR is too low, the base station will command the mobile station to increase its power. This closed-loop power control will prevent any power imbalance among all the uplink signals received at the base station. It should be noted that, however, the target SIR is not fixed, but is adjusted to a setpoint according to the needs of the individual radio link and a constant quality defined by an error rate. In general, the required target SIR depends on the mobile speed and the multipath profile. In order to avoid wasting power, the target SIR setpoint is allowed to float around the minimum value that just fulfils the required target quality and is controlled by an outer loop control of an RNC.

Outer loop control is typically implemented by having the base station tag each uplink user data frame with a reliability indicator. Should the frame quality indicator indicate to the RNC that the transmission quality is decreasing, the RNC will command the base station to increase the target SIR setpoint by a certain amount. Thus, when a mobile terminal is located at a great distance from the base station, the transmission power of the mobile terminal would increase and the uplink SIR target would also increase. At the edge of the coverage area, the mobile terminal may hit its maximum transmission power.

It is known that a Common Pilot Channel (CPICH) in the physical layer of the radio interface is an unmodulated code channel, and its function is to aid the channel estimation at the mobile terminal and the measurements for the handover and cell selection/reselection. From the CPICH, the mobile terminal can measure the received power on one code, after despreading, defined on the pilot symbols. The received power is known as Received Signal Code Power (RSCP). RSCP is used in intra-mode handover. In intra-mode handovers, the wideband received power within the channel bandwidth, or Received Signal Strength Indicator (RSSI) is also used. RSSI can be used in inter-system handovers involving a GSM system.

Typically, a WCDMA mobile terminal will enter a compressed mode (CM) after the IF or IS handover triggering condition has been met, and the mobile terminal will initiate the search for a new target cell using measurements on other WCDMA frequencies (IF) and/or GSM frequency bands (IS). CM requires raised transmission power of the mobile terminal. Thus, it is preferred to trigger the handover well in advance, so that this additional power increase can be realized and the degradation of the link can be avoided. It should be noted that, with a dual-receiver mobile terminal, it is not necessary for the mobile terminal to enter the compressed mode for measurements. Accordingly, the trigger is not necessarily well in advance of the actual handover.

Figure 3:
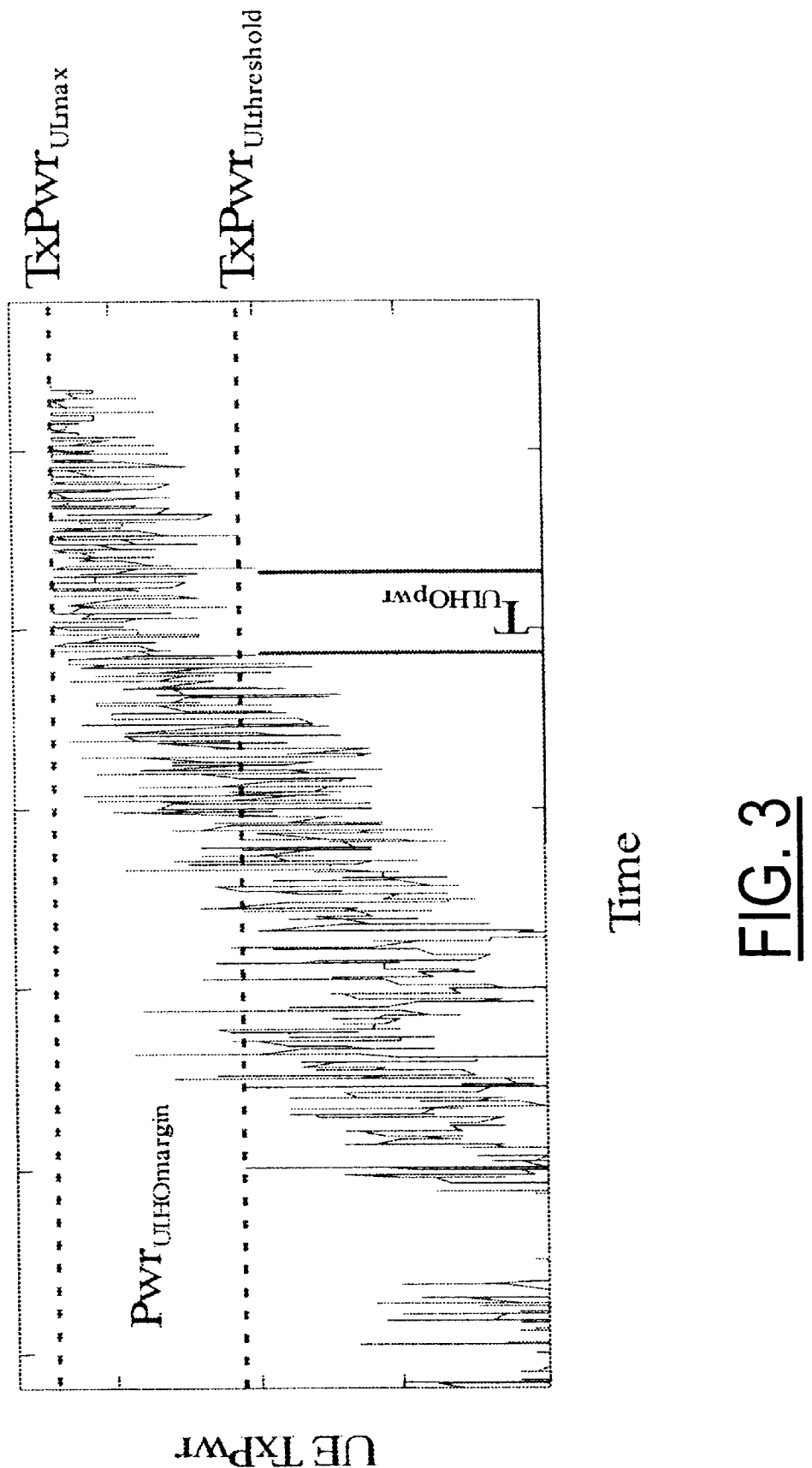
FIG. 3 is a diagrammatic representation illustrating the transmission power of the mobile terminal as a function of time.

As shown in FIG. 3, the increase in the mobile transmission power can be used to trigger a handover before the transmission power hits its maximum level. As shown, the maximum level is denoted as $TxPwr_{ULmax}$. It is desirable to set a threshold value $TxPwr_{ULthreshold}$, leaving a margin $Pwr_{ULHOmargin}$ between the maximum level and threshold value, so that the additional power required by the compressed mode can be realized. Thus, it is possible to trigger the handover if the uplink mobile transmission power has exceeded the threshold value longer than a specific time, $T_{ULHOpwr}$. The triggering condition, as depicted in FIG. 3, is particularly useful for a slow-moving, single-receiver mobile terminal with gradual increase of pathloss.

Figure 4:
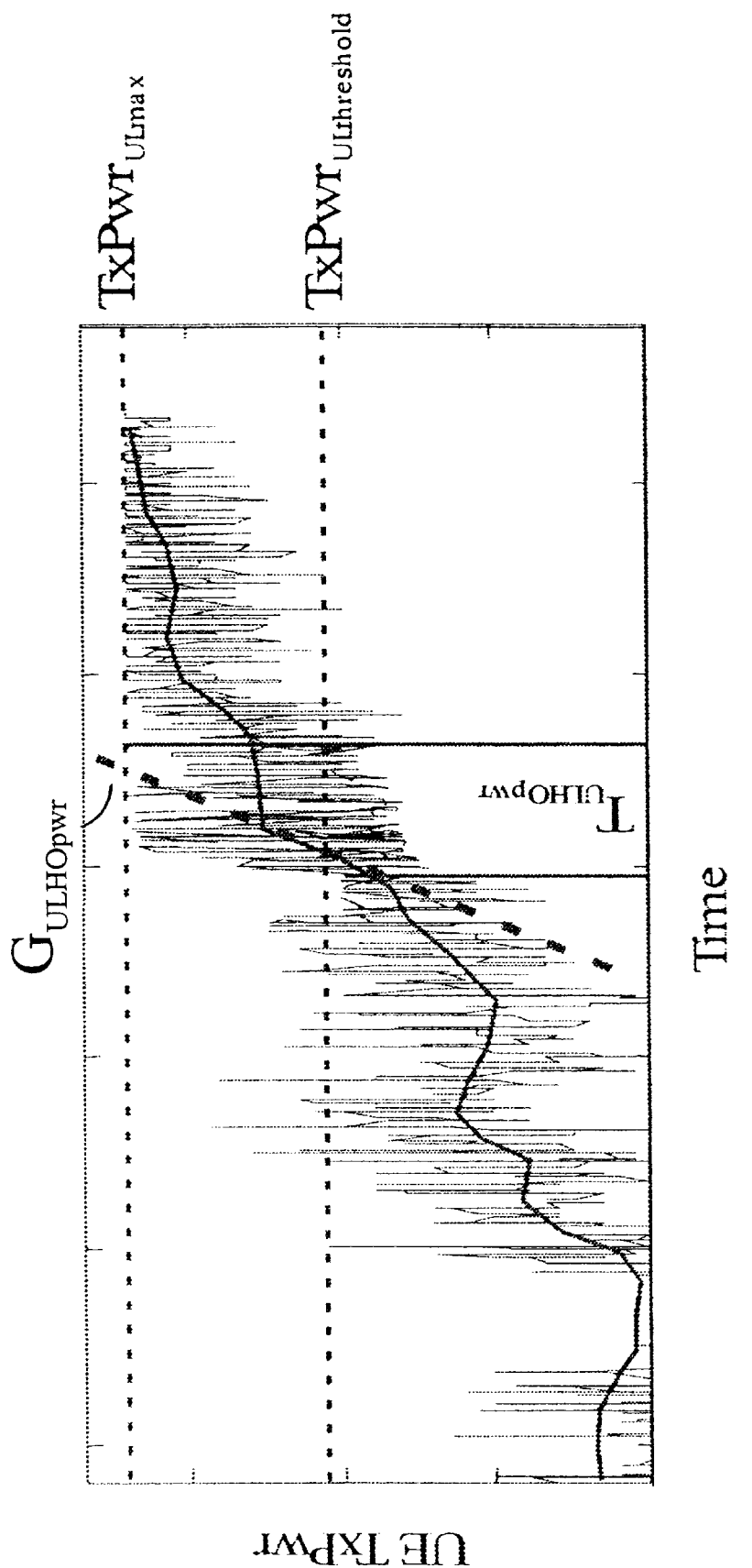
FIG. 4 is a diagrammatic representation illustrating the transmission power of the mobile terminal, as shown in FIG. 3, but for a different triggering criterion.

For fast-moving mobile terminals, pathloss increases quickly. For example, when the fast moving mobile terminal is entering a tunnel or becoming blocked by a building, a mountain, and so forth, it is more suitable to use a different condition for handover triggering. As shown in FIG. 4, it is possible to use the gradient of the power control signature to monitor the sudden rise of the transmission power due to the quick increase in pathloss. Accordingly, when the increase in the transmission power in the mobile terminal has exceeded its threshold value $TxPwr_{ULthreshold}$ and the gradient also reaches $G_{ULHOpwr}$, the handover triggering condition is met.

Figure 5:
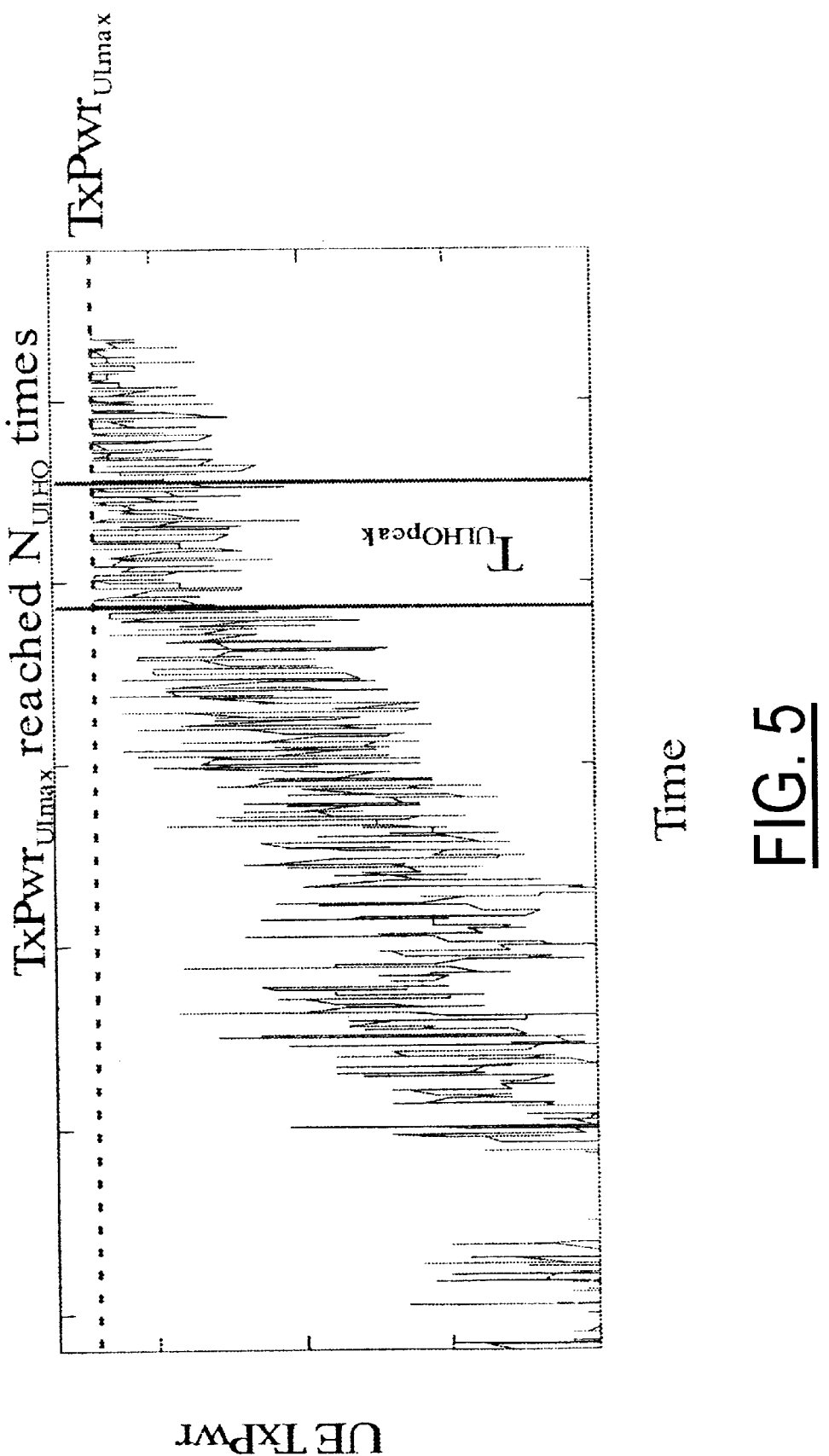
FIG. 5 is a diagrammatic representation illustrating the transmission power of the mobile terminal, as shown in FIG. 3, but for yet another triggering criterion.
Figure 6:
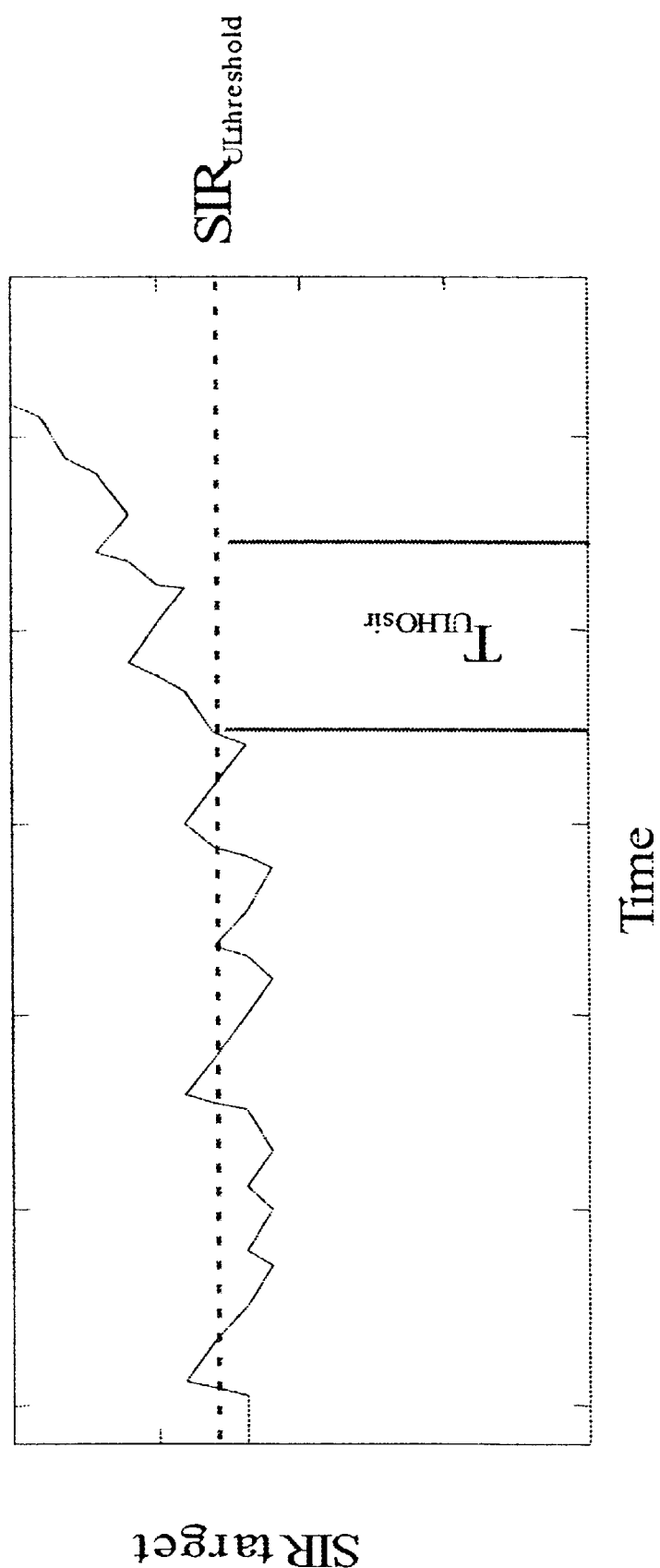
FIG. 6 is a diagrammatic representation illustrating the uplink signal-to-interference ratio at the base station as a function of time.

When the mobile terminal is experiencing period bursts of interference from another radio system, the transmission power of the mobile terminal increases so it will not be over-shouted by the other radio system. In that situation, as depicted in FIG. 5, it is possible to monitor the number of times that the mobile terminal hits its maximum power over a certain period of time, and use this number as a handover triggering condition. Furthermore, in the downlink direction, when the target SIR at the base station is increased and has exceeded a threshold value $SIR_{ULthreshold}$ longer than a specified time $T_{ULHOsir}$, the handover triggering condition is considered met, as shown in FIG. 6.

Figure 7:
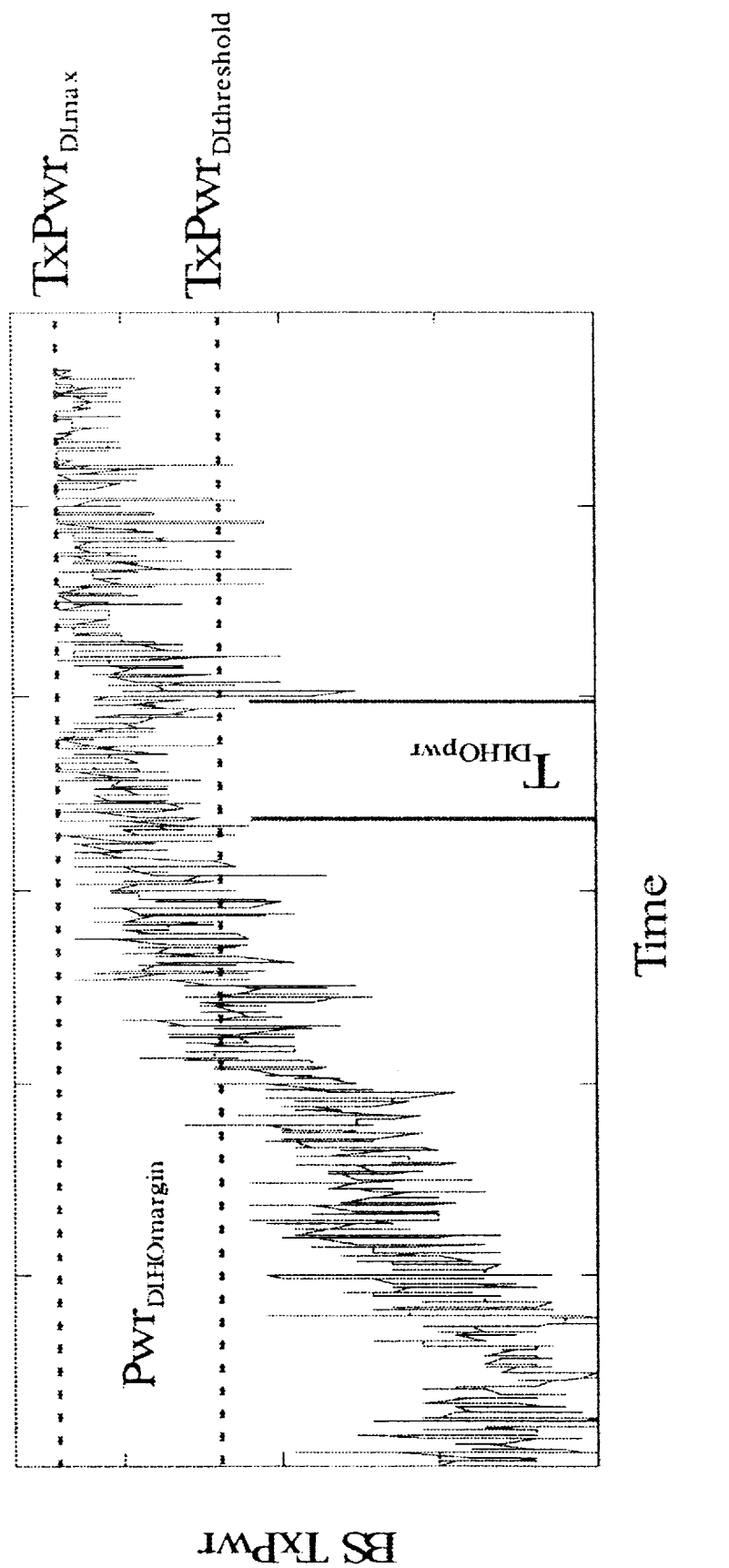
FIG. 7 is a diagrammatic representation illustrating the transmission power of the base station communicating with the mobile terminal.
Figure 8:
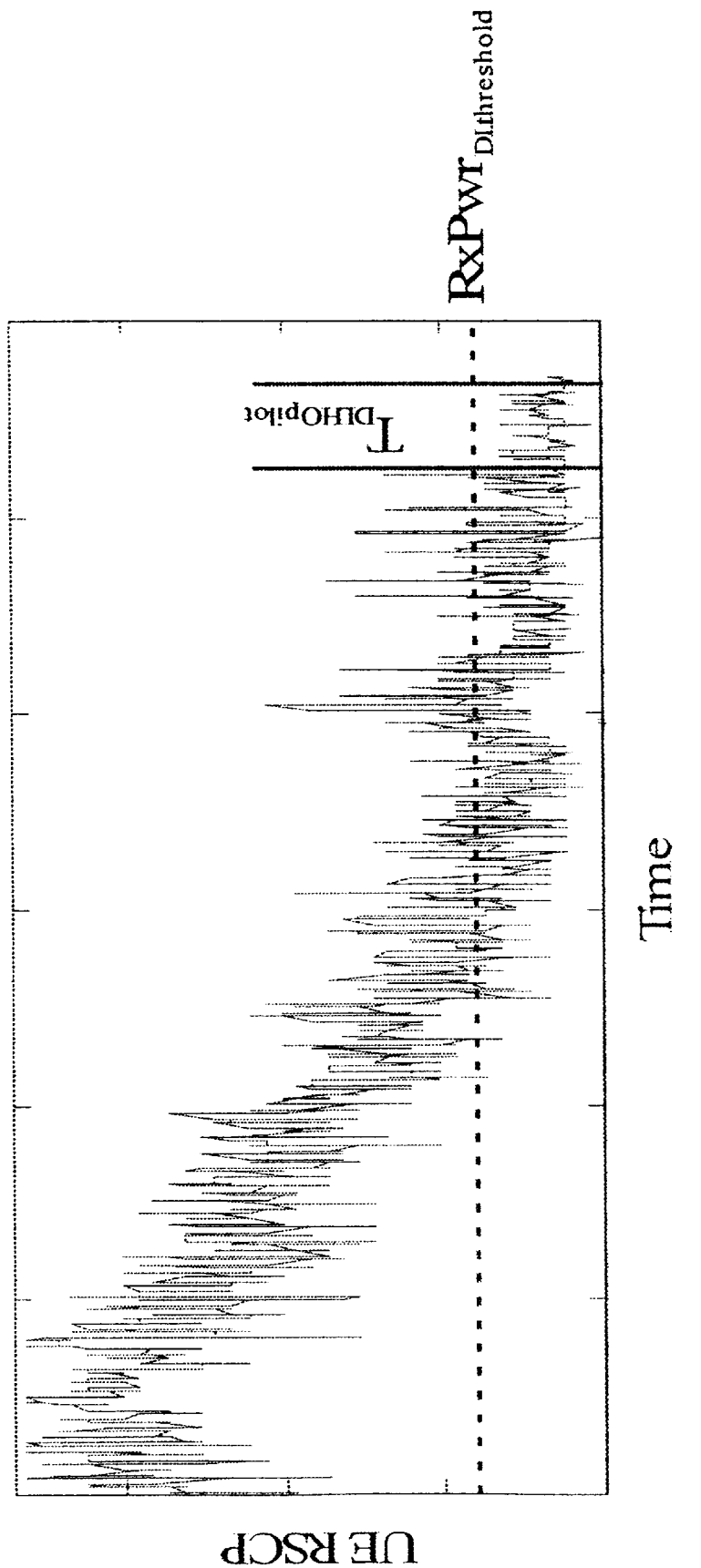
FIG. 8 is a diagrammatic representation illustrating the received signal code power of the mobile station as a function of time.

In the uplink direction, when the connection based power (BS TxPwr) in the downlink to the mobile terminal has exceeded its threshold $TxPwr_{DLtheshold}$ longer than a specified time $T_{DLHOpwr}$, the handover triggering condition is considered met, as shown in FIG. 7. When the pilot power (CPICH RSCP) measured at the mobile terminal has fallen below a predetermined value $PxPwr_{DLthreshold}$ longer than a specified time $T_{DLHOpilot}$, the handover triggering condition is also considered met, as depicted in FIG. 8. CPICH stands for the Common Pilot Channel, which is transmitted without power control at a fixed level, and RSCP stands for Received Signal Code Power, which is an absolute measure of the propagation loss from the base station to the mobile terminal.

In general, in the uplink direction, when the mobile transmission power or the target SIR has reached a certain criterion, the mobile terminal sends a report to the RNC. The RNC will decide the type of target cell to which the mobile terminal shifts, depending upon the type of service class the mobile terminal is using. The RNC initiates inter-system (IS) measurement for a handover from a WCDMA to a GSM/2G system. The RNC informs the mobile terminal (of single-receiver type) of the compressed mode pattern and provides the latter a neighbor list. The mobile terminal measures the Received Signal Strength Indicator (RSSI) of the GSM/2G cells in the neighbor list. The RNC commands the mobile terminal to decode the Base transceiver Station Identity Code (BSIC) of the best GSM/2G candidate. The mobile terminal may also start BSIC decoding automatically. Finally, the RNC sends handover command to the mobile terminal to complete the IS handover. The inter-frequency (IF) handover procedure is similar to that for the inter-system handover, except that the neighbor list contains WCDMA cells. In an IF handover, the mobile terminal measures the ratio of the average transmit energy per PN (pseudonoise sequence) chip to the total received power spectral density ($E_c/I_0$) from the neighbor cells. No BSIC decoding is done before handover. A decoding step is carried out to decode the system frame number (SFN) after the IF handover.

As for the handover triggering conditions using parameters in the downlink direction, the base station reports to the RNC when the handover triggering condition is met. The communication between the RNC and the mobile station, however, is similar to the handover triggering conditions using parameters in the uplink direction.

It should be noted that the maximum uplink transmission power $TxPwr_{ULmax}$ and the maximum downlink transmission power $TxPwr_{DLmax}$ may vary with the equipment used and the environment. Therefore, the threshold values $TxPwr_{ULthreshold}$ and $TxPwr_{DLthreshold}$ can only be expressed as a level relative to the corresponding maximum transmission power. Although it is preferred that the threshold value be in the range of 2 to 5 dB below the maximum transmission power, the threshold value can be outside the preferred range. Similarly, the target SIR depends on the practical quality of the equipment used and the environment and, therefore, the threshold value $SIR_{ULthreshold}$ can only be set based on the average target SIR. For example, $SIR_{ULthreshold}$ can be set at 2–5 dB above the average target SIR, but this level can also be set outside the range. As for the threshold value for received power, $PxPwr_{DLthreshold}$, it is possible to set the threshold value within 5 dB above the maximum Received Signal Code Power RSCP.

The specified time ($T_{ULHOpwr}$, $T_{DLHOpwr}$, $T_{ULHOpeak}$, $T_{ULHOsir}$, $T_{DLHOpilot}$) over which the threshold has been reached may also vary with the equipment used and technology. It is, therefore, practical only to provide a range in which the specified time is selected. For example, the specified time can be 50 ms to 2 s, but it can be longer or shorter. $N_{ULHO}$ is currently provided by the RNC, it is possible to select $N_{ULHO}$ within the range of 1 to 5, but this number can be higher if desired or necessary. As for the gradient $G_{ULHOpwr}$, it can be expressed as the percentage increase of the TxPwr relative to $TxPwr_{ULmax}$ over a period of time. For example, the triggering condition regarding $G_{ULHOpwr}$, can be a 50% increase in TxPwr relative to $TxPwr_{ULmax}$ in 500 ms, or a 10% increase in 50 ms, or other values, depending on whether the measurements can be supported by the mobile terminal.

Figure 9:
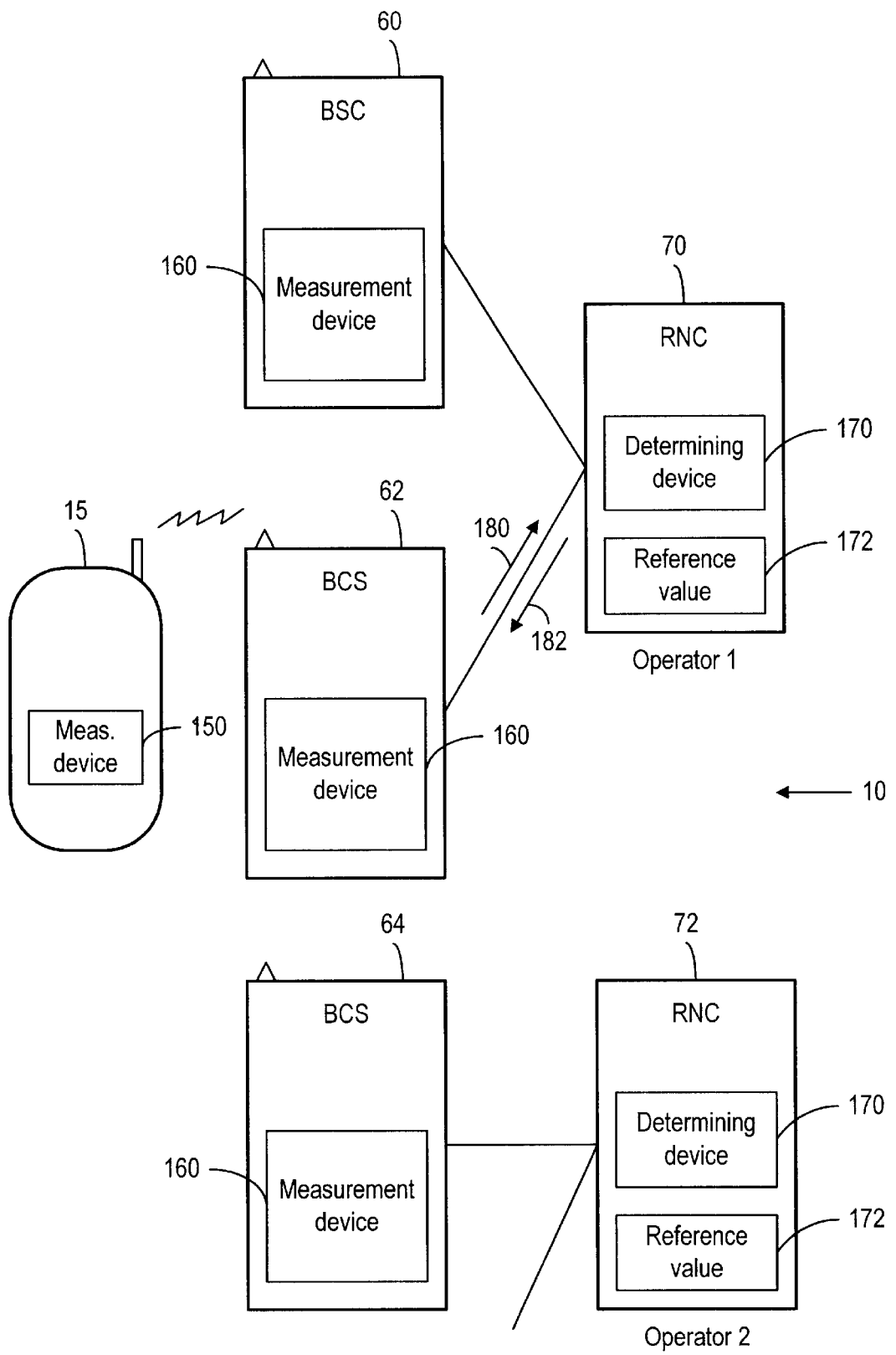
FIG. 9 is a diagrammatic representation of a system for triggering a handover event, according to the present invention, in telecommunications networks.

FIG. 9 shows a system for triggering a handover event in telecommunication networks 100. As shown in FIG. 9, the telecommunication networks 100 include a plurality of base stations 60, 62 operated by operator 1, and one or more base stations 64 operated by operator 2. The base stations 60 and 62 are linked to an RNC 70, and the base station 64 is linked to an RNC 72. Each of the base stations 60, 62 and 64 has a measurement device 160, which is capable of providing a triggering parameter to the linked RNC. Based on the triggering parameter, a determining device 170 in the RNC determines whether the trigger parameter has fulfilled a trigger condition based on a reference value 172. As shown, the mobile terminal 15 maintains a communication link with the base station 62 in the uplink and downlink. When the mobile terminal 15 moves from the radio coverage area of a first frequency carrier to the radio coverage of a second frequency carrier (see FIG. 1), the base station 62 sends a first signal 180 indicative of the triggering parameter to the RNC 70. The triggering parameter can be the increase in the transmission power of the mobile terminal 15, as depicted in FIG. 3; the sudden rise in the transmission power of the mobile terminal 15, as depicted in FIG. 4; the increase of the target SIR at the base station 62, as depicted in FIGS. 5 and 6; the connection based power in the downlink to the mobile station 15, as depicted in FIG. 7; or the pilot power measured at the mobile terminal 15, as depicted in FIG. 8. Once the RNC 70 decides which target cell the mobile terminal 15 will shift to, the RNC 70 informs the mobile terminal 15, via a second signal 182, to start the signal strength and/or signal quality measurement.

Although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of triggering a handover event in telecommunication networks having a plurality of base stations operated by a plurality of network operators each having one or more frequency carriers, wherein the handover event is used in a frequency division multiplex (FDD) mode of a mobile terminal capable of communicating with one or more base stations of the telecommunication networks over corresponding uplink and downlink, for allowing the mobile terminal to move from the radio coverage area of a first frequency carrier to the radio coverage area of a second frequency carrier while maintaining communication with one or more base stations, wherein the handover event is performed based on signal strength and/or signal quality measurement, said method comprising the steps of:

obtaining a first signal indicative of a triggering parameter;

determining from the first signal whether the triggering parameter has fulfilled a triggering condition regarding a reference value; and providing a second signal when the triggering parameter has fulfilled the triggering condition for starting the signal strength and/or signal quality measurement;

wherein the triggering condition is one of a set of triggering conditions each of which is sufficient for initiating handover measurements;

wherein the set includes a plurality of power values and at least one signal-to-noise ratio (SIR) value; and wherein, after the providing step, the mobile station receives a neighbor list and subsequently is sent a handover command.

2. The method of claim 1, wherein the triggering parameter is indicative of a transmission power of the mobile terminal in the uplink, and the reference value is indicative of a threshold value for the transmission power, and wherein the triggering condition is fulfilled when the transmission power has exceeded the threshold value over a predetermined period of time.

3. The method of claim 1, wherein the triggering parameter is indicative of a transmission power in the downlink to the mobile terminal, and the reference value is indicative of a threshold value of the transmission power, and wherein the triggering condition is fulfilled when the transmission power has exceeded the threshold value over a predetermined period of time.

4. The method of claim 1, wherein the triggering parameter is indicative of a transmission power of the mobile terminal and the reference value is a maximum value of the transmission power, and wherein the triggering condition is fulfilled when the transmission power has reached the maximum value over a predetermined number of times during a predetermined period of time.

5. The method of claim 1, wherein the triggering parameter is indicative of an uplink signal-to-interference ratio (SIR) targeted at one of the base stations, and the reference value is indicative of a threshold value of the SIR, and wherein the triggering condition is fulfilled when the targeted SIR has exceeded the threshold value over a predetermined period of time.

6. The method claim 1, wherein the triggering parameter is indicative of a transmission power of the mobile terminal, and the reference value is indicative of a threshold value of the transmission power, and wherein the triggering condition is fulfilled when the transmission power has exceeded the threshold value and an average of the transmission power over a period of time indicates that the transmission power is capable of reaching a maximum transmission power within a predetermined period of time.

7. The method of claim 1, wherein the triggering parameter is indicative of a ratio of a received signal power to a received signal strength indicator, and the reference value is indicative of a threshold value for the receiver signal power, and wherein the triggering condition is fulfilled when the ratio has fallen below the threshold value over a predetermined period of time.

8. The method of claim 1, wherein the mobile terminal comprises at least two receivers.

9. The method of claim 1, wherein the mobile terminal comprises a single receiver.

10. The method of claim 9, wherein the first network operator has at least one radio network controller for connecting one or more base stations to the telecommunication networks, and where the second signal is conveyed from the radio network controller to the mobile terminal to activate the compressed data transmission mode in the mobile terminal.

11. The method of claim 1, wherein the first network operator operates at a first frequency and the second operator operates at a second frequency different from the first frequency in a wideband code division multiplex access mode.

12. The method of claim 1, wherein the first network operator operates in a wideband code division multiplex access (WCDMA) mode and the second network operator operates in a mode in accordance with the global system for mobile communications (GSM).

13. The method of claim 1, wherein the first signal is sent to one of the plurality of network operators, wherein the step of determining is performed by the one of the plurality of network operators, and wherein the second signal is sent from the one of the plurality of network operators.

14. The method of claim 1, wherein if the handover is from a first system to a second system, then the neighbor list contains cells of the second system.

15. A system for triggering a handover event in telecommunication networks having a plurality of base stations operated by a plurality of network operators each having one or more frequency carriers, wherein the handover event is used in a frequency division multiplex (FDD) mode of a mobile terminal capable of communicating with one or more base stations of the telecommunication networks over corresponding uplink and downlink, for allowing the mobile terminal to move from the radio coverage area of a first frequency carrier to the radio coverage area of a second frequency carrier while maintaining communication with one or more base stations, wherein the handover event is performed based on signal strength and/or signal quality measurement, said system comprising:

means, communicative with the mobile terminal, for obtaining a triggering parameter and providing a first signal indicative of the triggering parameter; and means, responsive to the first signal, for determining whether the triggering parameter has fulfilled a triggering condition regarding a reference value, and for providing a second signal when the triggering parameter has fulfilled the triggering condition for starting the signal strength and/or signal quality measurement;

wherein the triggering condition is one of a set of triggering conditions each of which is sufficient for initiating handover measurements;

wherein the set includes a plurality of power values and at least one signal-to-noise ratio (SIR) value; and wherein the mobile terminal further comprises means for receiving a neighbor list and a handover command after the second signal is sent.

16. The system of claim 15, wherein the triggering parameter is indicative of a transmission power of the mobile terminal in the uplink, and the reference value is indicative of a threshold value for the transmission power, and wherein the triggering condition is fulfilled when the transmission power has exceeded the threshold value over a predetermined period of time.

17. The system of claim 15, wherein the triggering parameter is indicative of a transmission power in the downlink to the mobile terminal, and the reference value is indicative of a threshold value of the transmission power, and wherein the triggering condition is fulfilled when the transmission power has exceeded the threshold value over a predetermined period of time.

18. The system of claim 15, wherein the triggering parameter is indicative of a transmission power of the mobile terminal and the reference value is a maximum value of the transmission power, and wherein the triggering condition is fulfilled when the transmission power has reached the maximum value over a predetermined number of times during a predetermined period of time.

19. The system of claim 15, wherein the triggering parameter is indicative of an uplink signal-to-interference ratio (SIR) targeted at one of the base stations, and the reference value is indicative of a threshold value of the SIR, and wherein the triggering condition is fulfilled when the targeted SIR has exceeded the threshold value over a predetermined period of time.

20. The system of claim 15, wherein the triggering parameter is indicative of a transmission power of the mobile terminal, and the reference value is indicative of a threshold value of the transmission power, and wherein the triggering condition is fulfilled when the transmission power has exceeded the threshold value and an average of the transmission power over a period of time indicates that the transmission power is capable of reaching a maximum transmission power within a predetermined period of time.

21. The system of claim 15, wherein the triggering parameter is indicative of a ratio of a received signal power to a received signal strength indicator, and the reference value is indicative of a threshold value for the receiver signal power, and wherein the triggering condition is fulfilled when the ratio has fallen below the threshold value over a predetermined period of time.

22. The system of claim 15, wherein the mobile terminal comprises at least two receivers.

23. The system of claim 15, wherein the mobile terminal comprises a single receiver.

24. The system of claim 23, wherein the first network operator has at least one radio network controller for connecting one or more base stations to the telecommunication networks, and where the second signal is conveyed from the radio network controller to the mobile terminal to activate the compressed data transmission mode in the mobile terminal.

25. The system of claim 15, wherein the first network operator operates at a first frequency and the second operator operates at a second frequency different from the first frequency in a wideband code division multiplex access mode.

26. The system of claim 15, wherein the first network operator operates in a wideband code division multiplex access (WCDMA) mode and the second network operator operates in a mode in accordance with the global system for mobile communications (GSM).

27. The method of claim 15, wherein the first signal is sent to one of the plurality of network operators, wherein the step of determining is performed by the one of the plurality of network operators, and wherein the second signal is sent from the one of the plurality of network operators.

28. The system of claim 15, wherein if the handover is from a first system to a second system, then the neighbor list contains cells of the second system.

* * * * *

UNITED STATES PATENT AND TRADEMARK OFFICE
CERTIFICATE OF CORRECTION

PATENT NO.      : 6,615,044 B2
DATED           : September 2, 2003
INVENTOR(S)     : Tigerstedt et al.

It is certified that error appears in the above-identified patent and that said Letters Patent is hereby corrected as shown below:

Column 1,
Line 32, "(In)" should be -- (Iu) --

Column 6,
Lines 42 and 47, "UL110" should be -- ULHO --

Column 8,
Line 4, both occurrences of "UL110" should be -- ULHO --
Lines 10, 12 and 15, "UL110" should be -- ULHO --

Column 12,
Line 23, "method" should be -- system --

Signed and Sealed this

Twenty-third Day of March, 2004

JON W. DUDAS
*Acting Director of the United States Patent and Trademark Office*